Figure 1:
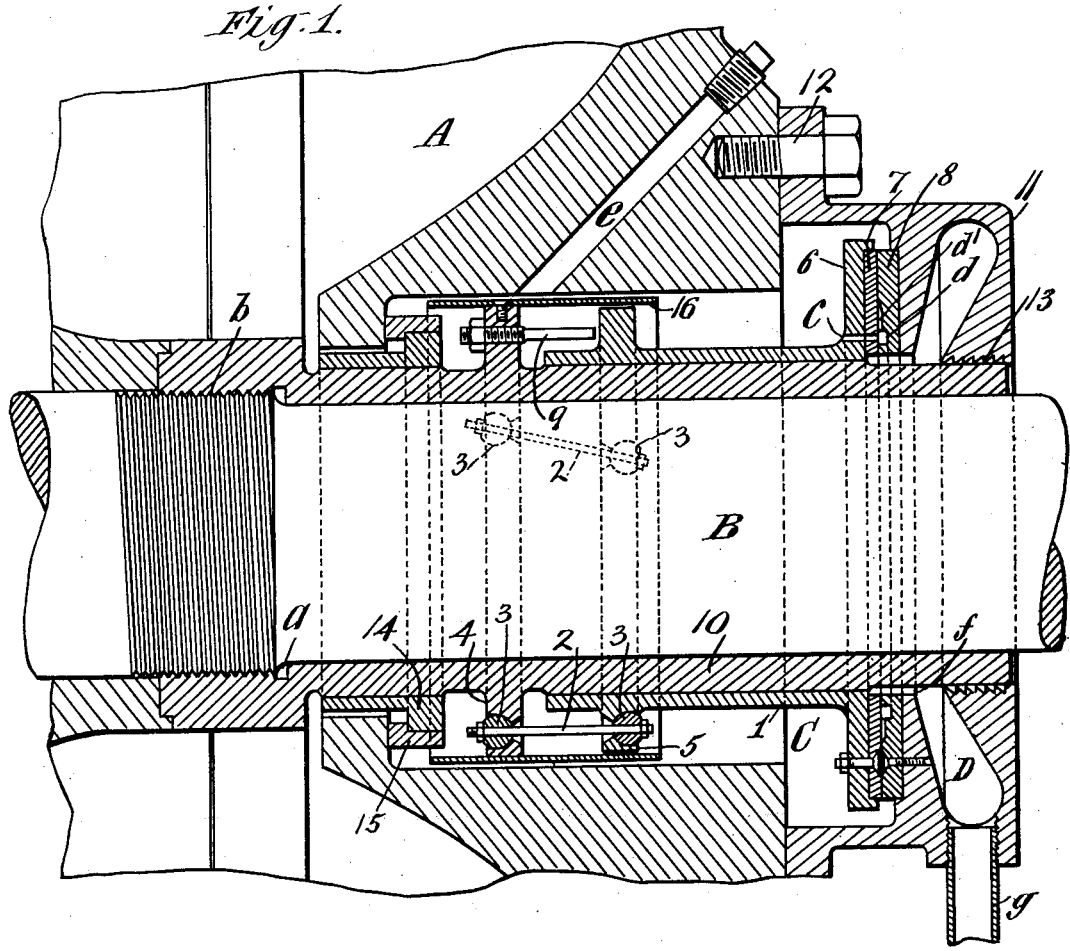

June 23, 1925.

R. W. ALLERTON

SHAFT PACKING

Filed March 3, 1921

1,543,309

INVENTOR
Robert W. Allerton

BY HIS ATTORNEYS

Patented June 23, 1925.

1,543,309

UNITED STATES PATENT OFFICE.

ROBERT W. ALLERTON, OF SOUTH ORANGE, NEW JERSEY, ASSIGNOR TO WORTHINGTON PUMP AND MACHINERY CORPORATION, OF NEW YORK, N. Y., A CORPORATION OF VIRGINIA.

SHAFT PACKING.

Application filed March 3, 1921. Serial No. 449,304.

*To all whom it may concern:*

Be it known that I, ROBERT W. ALLERTON, a citizen of the United States, residing at South Orange, county of Essex, and State of New Jersey, have invented certain new and useful Improvements in Shaft Packings, fully described and represented in the following specification and the accompanying drawings, forming a part of the same.

This invention relates to means for packing shaft bearings of centrifugal pumps and the like, such as water wheel shafts, steam turbine shafts, etc.

The use of soft packing in the bearings of high speed centrifugal pumps working against high pressure heads is objectionable, because when the pressure liquid gets behind the packing the latter is tightened up to such an extent that there is no leakage, and, as is well known, where no leakage occurs with soft packing used under these conditions, the packing will often burn up. Such stoppage of leakage liquid not only shortens the life of the packing, but it also occasions excessive wear of the shaft sleeve, such wear being further increased where dirty water being pumped leaks into the stuffing box. Under these conditions there is continued demand for renewal of the shaft packing and shaft sleeves.

It is the aim of the present invention to overcome these difficulties and at the same time provide an efficient packing means especially adapted for large size stuffing boxes of centrifugal pumps and the like operating at high speeds and against high pressure heads, which will enable such pumps to be run with minimum wear and heating of the packing and associated parts, and to also reduce leakage of the lubricating liquid as far as possible consistent with the proper operation of the packing construction herein set forth, when embodied in pumps working under these conditions.

To enable those skilled in the art to understand the invention, the same will now be described in detail in connection with the accompanying drawings, and the novel features thereof then be specifically pointed out in the claims.

In the drawings—

Figure 2:
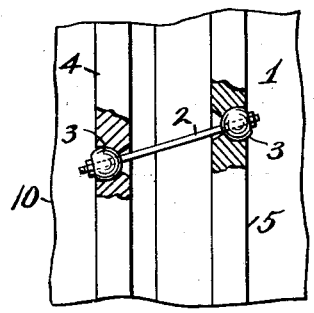

Figure 1 is a longitudinal sectional view of a stuffing box of a centrifugal pump or the like, showing the pump shaft and the improved packing or sealing controlling means in working position, and Figure 2 is a partial view showing the preferred normal position of the connections for the control sleeve.

Referring now to the drawings, A indicates generally that portion of a centrifugal pump casing in which one of the stuffing boxes is formed. B indicates the pump shaft, that portion of such shaft which is within the stuffing box being reduced in diameter as indicated at $a$. On such reduced portion of the shaft B is mounted a sleeve 10 having threaded engagement at $b$ with the pump shaft so as to rotate therewith. The stuffing box cap 11 is secured to the pump casing by bolts 12, the bearing surface at this point being provided with labyrinth packing rings 13 to prevent leakage. At its other end the stuffing box is sealed by bushing 14, preferably made in halves and held in place by a bushing ring 15. The parts 14, 15 are necessary only when the device is applied to a stuffing box on the suction side of a centrifugal pump, as hereinafter explained.

In order to provide an efficient packing or leakage-preventing means for the stuffing box, and to automatically prevent unnecessary wear or heating of the bearing surfaces thereof, there is mounted on sleeve 10 a longitudinally and rotatively movable packing sleeve 1 which is attached to sleeve 10 by links or swing bolts 2 having ball and socket joints 3 formed in peripheral flanges 4, 5 on sleeves 10 and 1, respectively. The sleeve 1 has secured to an end flange 6 a packing ring or plate 7 which is adapted, under normal working conditions, to bear against a similar plate 8 secured to the cap piece 11. A bore $c$ through the flange 6 of sleeve 1 and plate 7 registers with a small annular groove $d$ formed in the bearing face of plate 8 for admitting pressure liquid from chamber C to the bearing surfaces of both the plates 7, 8. It will be noted that the groove $d$ is located near the inner portion of plate 8, as the tendency of a liquid introduced between two such bearing surfaces is to move outward therebetween. To insure such radial circulation, the face of the plate 8 is preferably formed with an annular cut-away portion $d'$ sloping from the bearing surface toward the outer edge of the groove $d$. By means of bore $c$ and groove $d$, the full pressure from chamber C is admitted between the bearing plates 7, 8 and, with a radial discharge from groove $d$, a large part of the bearing surfaces will have the same pressure as in chamber C or a greater pressure, thus reducing the unbalanced area of plate 7 subjected to the pressure in chamber C and aiding in reducing the friction between the plates 7, 8. Pressure liquid is supplied to chamber C through bore $e$ from any suitable source of supply, as, for example, the discharge side of the pump, where clean water is being pumped, or from any other suitable source when the liquid is dirty. The pressure of the liquid thus supplied to chamber C, acting on the exposed side of the flange 6, normally tends to maintain the packing ring or plate 7 in contact with plate 8. One or more stop bolts 9, for limiting longitudinal movement of the sleeve 1 as hereinafter explained, are provided, such bolts being secured in proper position on the flange 4 by ordinary lock nuts to prevent displacement. A shield 16, preferably secured to flange 4, is provided, which encloses the flanges 4, 5, swing bolts 2 and stop bolts 9, to reduce any tendency toward churning action of these parts when revolving rapidly in the pressure liquid.

It will be obvious that when for any reason the bearing surfaces 7, 8 fail to run smoothly, or are pressed too tightly together, the friction will increase the pull on the swing bolts 2, thereby causing the bearing plate or ring 7 to lag behind the sleeve 10. This will result in the swing bolts 2 being thrown still further out of longitudinal alinement with the shaft, shorten the connection between the flanges 4 and 5, and pull the sleeve 1 to the left in Fig. 1, thereby separating slightly the bearing faces of the plates 7 and 8 and reducing the friction and permitting an increased flow of the cooling liquid in chamber C between them. Leakage liquid will pass through openings $f$ into chamber D and from thence through pipe $g$ to waste or other point.

When the stuffing box packing above described is used on the discharge side of a centrifugal pump, the bushings 14, 15 may be omitted, if the liquid being pumped is clean, as such discharge liquid will fill the stuffing box chamber C when the pump is running and be maintained under sufficient pressure to cause the device to operate as above described.

It will be understood that various changes may be made in the construction shown and described and still be within the scope of the claims, and that the invention is not to be confined to use with centrifugal pump stuffing boxes, but may be used as a stage packing therein, and also may be used in other relations where leakage-preventing packing for rotating shafts is desirable, and is thus claimed.

What is claimed is:

1. A packing for centrifugal pumps and the like, comprising a member rotated by the shaft, a sealing plate carried by said member co-acting under pressure with a second sealing plate, and link connections between the shaft and said member for moving the latter longitudinally of the shaft and against such pressure to separate the sealing plates on excessive friction between them.

2. A packing for centrifugal pumps and the like, comprising a member rotated by the shaft and having movement longitudinally of the shaft, a sealing plate carried by said member and co-acting with a second sealing plate under liquid pressure, and link connections for moving said member longitudinally of the shaft and against the pressure of the liquid to separate the sealing plates on retardation of rotary movement of said member by excessive friction between the sealing plates.

3. A packing for centrifugal pumps and the like, comprising a sleeve rotated by the shaft and having movement longitudinally of the shaft, a sealing plate carried by said sleeve and co-acting with a second sealing plate under liquid pressure, link connections between said shaft and sleeve for moving the latter longitudinally of the shaft and against the pressure of the liquid to separate the sealing plates on retardation of rotary movement of said sleeve by excessive friction between the sealing plates, and passages for supplying pressure liquid to said bearing surfaces.

4. A packing for centrifugal pumps and the like, comprising a sleeve rotated by the shaft and having movement longitudinally of the shaft, a sealing plate carried by said sleeve and co-acting with a second sealing plate under liquid pressure, link connections between said shaft and sleeve for moving the latter longitudinally of the shaft and against the pressure of the liquid to separate the sealing plates on retardation of rotary movement of said sleeve by excessive friction between the sealing plates, and a shield covering said sleeve and shaft connections.

5. A packing for centrifugal pumps and the like, comprising a shaft sleeve secured to the pump shaft, a loose sleeve mounted on said shaft sleeve, a sealing plate carried by the loose sleeve and co-acting with a second sealing plate under liquid pressure, and swing bolt connections between said loose sleeve and the shaft sleeve for moving the former longitudinally of the shaft on retardation of rotary movement of the loose sleeve.

6. A packing for centrifugal pumps and the like, comprising shaft sleeve 10 on shaft B, loose sleeve 1 on the shaft-sleeve, bearing plate 7, carried by sleeve 1, stationary bearing plate 8 coacting with plate 7, and swing bolt connections 2 between said shaft sleeve and loose sleeve acting to relieve the pressure between plates 7, 8 on excessive friction and retardation of sleeve 1.

7. A packing for centrifugal pumps and the like, comprising shaft sleeve 10 on shaft B, loose sleeve 1 on the shaft sleeve, bearing plate 7 carried by sleeve 1, stationary bearing plate 8 coacting with plate 7, pressure liquid chamber C on the outer side of plate 7, plate 7 having passage $c$ connecting chamber C with groove $d$ in plate 8 to supply pressure fluid between the plates, and swing bolts 2 between said shaft sleeve and loose sleeve.

8. A packing for centrifugal pumps and the like, comprising shaft sleeve 10 on shaft B, loose sleeve 1 on the shaft sleeve, bearing plate 7 carried by sleeve 1, stationary bearing plate 8 coacting with plate 7, pressure liquid chamber C on the outer side of plate 7, plate 7 having passage $c$ connecting chamber C with groove $d$ in plate 8 to supply pressure fluid between the plates, swing bolts 2 between said shaft sleeve and loose sleeve, and bushings 14, 15, coacting with the pump casing to close chamber C at the inner end.

In testimony whereof, I have hereunto set my hand.

ROBERT W. ALLERTON.